United States Patent [19]

Stellmach

[11] Patent Number: 5,423,083

[45] Date of Patent: Jun. 6, 1995

[54] SELECTOR ADAPTOR FOR CONVERTING A CELLULAR PHONE TO A BAG PHONE

[76] Inventor: Robert N. Stellmach, 10312 136th St., N., Largo, Fla. 34644

[21] Appl. No.: 195,095

[22] Filed: Feb. 14, 1994

[51] Int. Cl.⁶ ............................................ H04M 11/00
[52] U.S. Cl. ...................... 455/127; 455/90; 379/58
[58] Field of Search ............... 455/89, 90, 127, 343; 379/58, 437, 457

[56] References Cited

U.S. PATENT DOCUMENTS

| | | | |
|---|---|---|---|
| 4,850,006 | 7/1989 | Sasaki et al. | 379/58 |
| 4,903,325 | 2/1990 | Yoshitake et al. | 455/90 |
| 4,939,770 | 7/1990 | Makino | 455/127 |
| 4,974,250 | 11/1990 | Tomiyori | 379/58 |
| 5,261,121 | 11/1993 | Hashimoto | 455/127 |

OTHER PUBLICATIONS

"Brochure of the Nokia C15" The Nokina Corp. 1993.

Primary Examiner—Reinhard J. Eisenzopf
Assistant Examiner—Thanh Le
Attorney, Agent, or Firm—Harold D. Shall

[57] ABSTRACT

A selector adapter for a transportable cellular phone that has been converted to a bag phone including a master module which contains the circuits for alternately connecting one of a plurality of power sources to the cellular phone and a connector module for connecting the master module to the cellular phone and the power sources.

4 Claims, 1 Drawing Sheet

SELECTOR ADAPTOR FOR CONVERTING A CELLULAR PHONE TO A BAG PHONE

BACKGROUND OF THE INVENTION

1. Field of the Invention

This invention relates to selector adapters generally and more specifically to a selector adaptor for cellular transportable phones that have been made into bag phones; a bag phone being a cellular transportable phone that is placed in a carrying bag along with a substantial battery and connected thereto by an adaptor cord.

2. Description of Prior Art

Cellular transportable phones that have been made into bag phones are well known in the art, such as the NOKIA C15 (register trademark of NOKIA OG, Finland). Such a phone may be plugged into the cigarette lighter socket of a car, boat or truck, so it can be connected to a battery for use as a transportable. Some transportable phones may also be connected by an adapter to a 110 volt outlet and operated therefrom. However, each of these operations requires a separate adapter cord to be separately connected to the cellular phone so that the operator must carry and be prepared to connect and disconnect one of a multiple supply of adaptor cords to the transportable phone and to the power source to which it is connected.

SUMMARY OF THE INVENTION

This invention includes a master module which contains the circuits for alternately connecting one of a plurality of power sources to the cellular transportable phone. A connector module connects to the master module and is the main connector for all harness assemblies to match to the various transportable phone manufacture's main power connector.

The connector module has four adapter cords extending therefrom. A first cord is connectable to the cellular phone's connection outlet. A second cord is connectable to the external battery pack and when both the first and second cords are connected the phone will now operate on the external battery pack. A third cord is connectable to a cigarette lighter as a source of power and the phone can then be operated; simultaneously, the external battery pack will be charging from the cigarette lighter source. When the third cord is disconnected, a fourth cord can be connected to a 110 volt AC source at which time the master module disconnects the battery pack from the phone and connected the battery pack to the 110 volt AC source for charging the battery. Disconnecting the fourth cord from the 110 volt source causes the master module to reconnect the battery to the phone. All modes of operation do not require each of the individual cords to be plugged and unplugged from the cellular phone itself or from the connector module.

DETAILED DESCRIPTION OF THE PREFERRED EMBODIMENT

Figure 2:
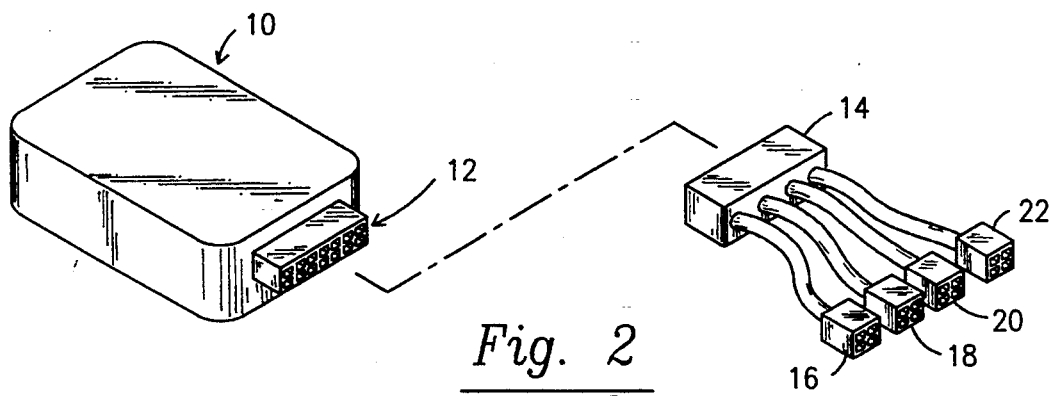
FIG. 2 is a perspective view of the master module and a connector module ready to be connected thereto.

Referring now to the drawings, and more particularly FIGS. 2, a master module is shown at 10 and has a plurality of connector pins shown generally and collectively at 12 at one end thereof. A connector module for a particular cellular transportable phone is shown at 14 and the pin connectors therein for connecting with the various pins 12 of the master module depends on the particularities of the specific phone manufacturer. These pin connectors, accordingly, will vary from the various phone manufacturers requirements. Extending from the connector module 14 are four (4) harnesses 16, 18, 20 and 22, with the harness 16 ultimately being connectable to the cigarette lighter adapter (not shown), the harness 18 being connected to the battery pack (not shown), the harness 20 being connectable to the source of 110 volt AC power (through a 12 volt DC adaptor (not shown) and the harness 22 being connected to the transportable cellular phone (not shown).

Figure 1:
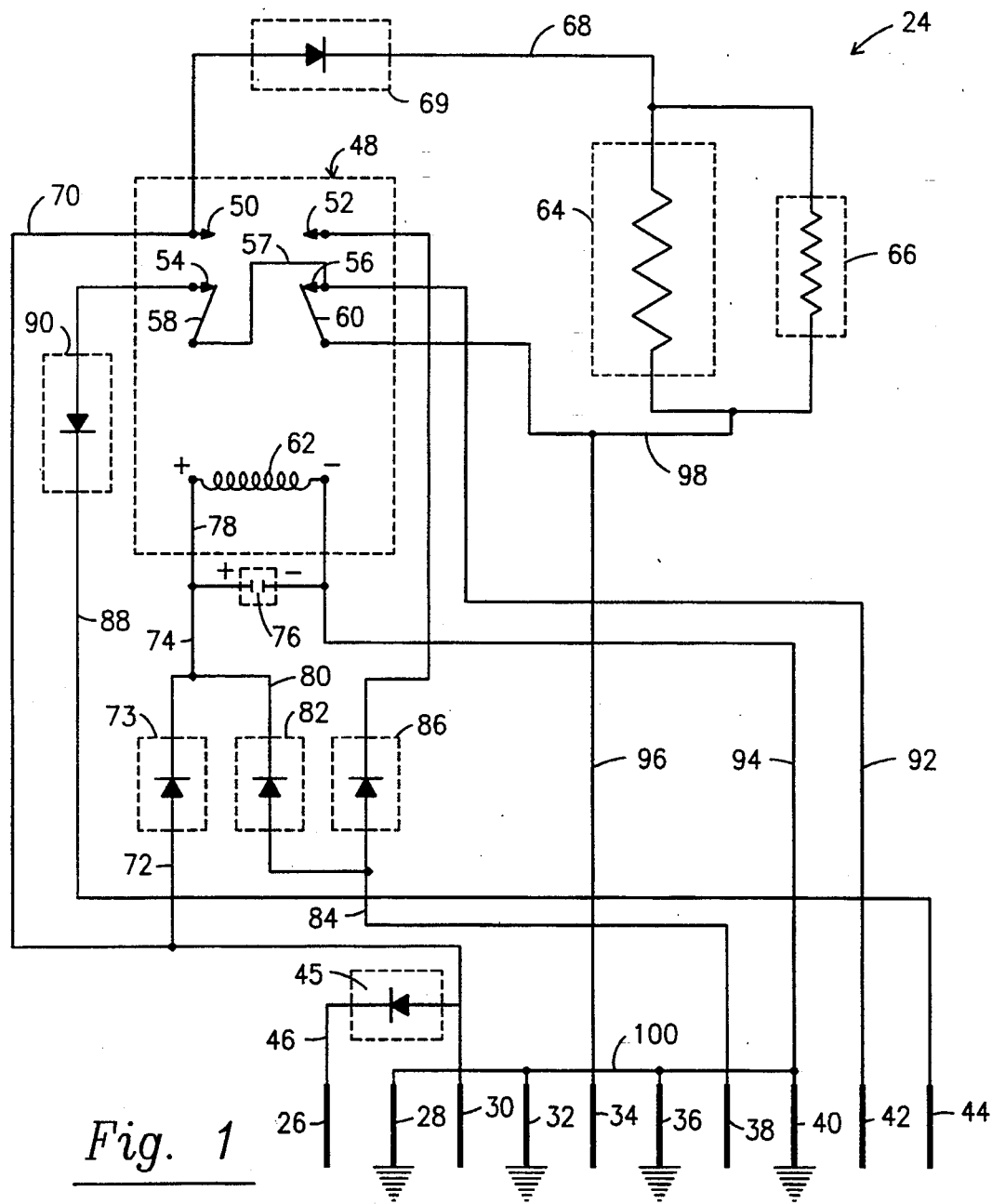
FIG. 1 is a schematic view of the circuitry within the master module.

Referring now to FIG. 1, wherein a schematic view of the master module is shown generally at 24, a high output connector pin 26 is provided for connection to the connector module 14 and from the latter to the cellular phone harness 22 if the particular cellular phone requires such a source of power. The next connector pin 28 is a ground provided for a ground connector to the cigarette lighter harness 16 and the next connector pin 30, like pin 28, is connected to the harness 16 for providing a source of power to the master module 24 from the cigarette lighter harness. The next connector pin 32 is provided for a ground connection to the battery pack through the harness 18 while the next connector pin 34 is also connected to the battery pack through the harness 18 to provide a source of power to the master module 24 from the battery pack. The next connector pin 36 provides a ground through the harness 20 to the source of 110 volt AC power adapter through the harness 20 while the next connector pin 38 provides a source of power to the master module from the adapter source of 110 volt power through the harness 20. The next connector 40 provides a ground for the cellular phone through the harness 22, while the next connector pin 42 provides a source of twelve volt positive power to the cellular phone through the harness 22 and the connector pin 44 is a low power output source which can be connected to the cellular phone through the harness 22 to indicate to the phone that it is being supplied power from the battery pack.

A conductor 46 connects the connector 26 to the connector 30 so that power may flow from the connector 30 to the connector 26 and a one way rectifier diode 45 in line 46 insures that power only flows in that direction. Diode 45 may be obtained from Radio Shack under part number 276-1101. A relay shown generally at 48 is obtainable from IDEC as relay DPDT with 2 amp contacts and includes a pair of normally open contacts 50 and 52, a pair of normally closed contacts 54 and 56 which contacts 50, 52, 54 and 56 are opened and closed by switch contactors 58 and 60. Also included in the relay 48 is an actuation coil 62; which magnetically operates the switch contactors 58 and 60 between their opened and closed positions, and a conductor 57 which connects the switch contactor 58 to the contact 56.

The master module 24 includes a resistor 64 which is a current limiting resistor for the battery pack charge in the heavy recharge mode from the cigarette lighter harness; such a resistor can be obtained from NTE as part number 5WO22. Connected in parallel with the resistor 64 is a thermistor 66 which is also in the battery pack charge circuit from the cigarette lighter harness and is current limiting for a normal charge and if higher charge rates are required, it will increase in value and actually allow resistor 64 to remain as the current limiting device for the charge mode from the cigarette lighter harness. The thermistor 66 can be obtained as a Western Digital PTC Switching Thermal Resistor number WP3005DE100N.

The resistor 64 and thermistor 66 are connected by a conductor 68 to the contact 50; the conductor 68 having a diode 69 therein allowing the current in conductor 68 to flow only in the direction from the contact 50 to resistor 64, and the contact 50 is connected by a conductor 70 to the connector pin 30 and is operable to be energized thereby. A conductor 72 having a rectifying diode 73 therein connects the conductor 70 to a conductor 74, the latter in turn being connected to the positive terminal of a capacitor 76, which capacitor is used to filter source voltage from the 110 volt AC source to avoid coil fluctuations and contract vibration. A capacitor suitable for the this purpose is part number 685RSS050M available from Illinois Capacitor Inc. The diode 69 is part number 1N5822 manufactured by Motorola and diode 73 being Radio Shack Rectifier Diode P/N 276-1101. The conductor 74 has connected thereto a conductor 78 which extends to the positive terminal of the actuation coil 62. The conductor 74 also has a conductor 80 connected thereto, which conductor has a rectifying diode 82 therein (Radio Shack part number 276-1101) and is connected at its other end to a conductor 84. The conductor 84 connects to the connector pin 38 and connects at its opposite end to the contact 52 of the relay 48; the conductor 84 having a rectifying diode 86 therein (Radio Shack part number 276-1101) at a location between the juncture therewith of the conductor 80 and the contact 52. Connected to the contact 54 is a conductor 88 having a rectifying diode 90 therein (Radio Shack part number 276-1101), which conductor 92 is connected to the connector pin 42 and extends to and is connected to the contact 56 of the relay 48, while a conductor 94 is connected to the connector pin 40 and extends to and is connected to the negative terminal of the actuation coil 62 and the negative terminal of the capacitor 76. A conductor 98 is connected at its right end to the resistor 64 and the thermistor 66 and at its left end to the switch contactor 60. A conductor 100 connects to the connector pins 28, 32, 36 and 40 so that all four (4) grounding pins are joined.

OPERATION

With the phone connected to harness 22, thereby connecting the connector pins 26, 40, 42 and 44 to the phone, and the battery pack connected to the harness 18, thereby connecting the connector pins 32 and 34 to the battery pack, the relay 48 is in its normal state with the normally closed contacts 54 and 56 closed and the normally open contacts 50 and 52 open, and the coil 62 is not activated. The normally closed contacts 54 and 56 provide battery power to the phone and the battery is disconnected from the connecting pin 38 of the 110 volt DC source and from the pin 30 of the cigarette lighter source. When the cigarette lighter adapter is activated, the actuation coil 62 is activated and the normally open contacts 50 and 52 are contacted by the switch contactors 58 and 60 and receive power therefrom while the normally closed contacts 54 and 56 are opened. The phone contactor pins receive power from the contactor pin 30 and the phone is activated thereby, while the low power connector pin 44 to the phone is disconnected. Simultaneously the battery pack is disconnect from the phone contact pins and is connected to the lighter adapter for battery charge.

With the cigarette lighter adapter 16 disconnected and the 110 volt DC adapter plugged into a receptacle for charging, the actuation coil 62 of the relay 48 is activated and the normally open contacts 50 and 52 become engaged by the contactors 58 and 60 respectively. The battery pack becomes disconnected form the phone and the battery pack becomes connected to the 110 volt DC, (reduced to 12 volts DC by an adapter) and is charging. At this time the phone is not operational for its own protection.

Although the above description relates to a presently preferred embodiment, numerous changes can be made therein without departing from the scope of this invention as claimed in the following claims.

What is claimed is:

1. A selector adaptor for a cellular transportable phone that has been made into a bag phone comprising in combination,
    a) a first, a second, a third and a fourth set of connector means,
    b) said first set of connector means being connectable to the cellular phone,
    c) said second set of connector means being connectable to a source of 12 volts DC from an 110 volt AC adaptor,
    d) said third set of connector means being connectable to a battery pack, and
    e) said fourth set of connector means being connectable to a cigarette lighter,
    f) and circuit means in said selector adapter for selectively connecting said sets of connector means,
    g) said circuit means includes (i) a first circuit for connecting said first set of connector means to said third set of connector means while disconnecting said second and fourth sets of connector means from said first and third set of connector means, (ii) a second circuit for connecting said first set of connector means to said fourth set of connector means and to said third set of connector means while disconnecting said third set of connector means and said second set of connector means from said first set of connector means, (iii) and a third circuit for connecting said second set of connector means to said third set of connector means while disconnecting both said second and third set of connector means from said first and fourth set of connector means.

2. The selector adapter according to claim 1 wherein said circuit means includes a relay circuit comprised of a pair of normally open switches, a pair of normally closed switches, a first and a second switch member for actuating said switches, and an actuating coil for actuating said switches.

3. The selector adapter according to claim 1 wherein said circuit means includes a resistor and a thermistor connected in parallel to control the charging current.

4. The selector adapter according to claim 1 wherein each of said sets of connector means is a plurality of connector pins, said selector adapter being connectable to a connector module having four adapter cords extending therefrom.

* * * * *